United States Patent
Xu et al.

(10) Patent No.: US 10,101,493 B2
(45) Date of Patent: *Oct. 16, 2018

(54) METHOD FOR CORRECTING NATURAL GAMMA RAY LOGGING MEASUREMENTS

(71) Applicant: SCHLUMBERGER TECHNOLOGY CORPORATION, Sugar Land, TX (US)

(72) Inventors: Libai Xu, Katy, TX (US); Jiaxin Wang, Katy, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 92 days.

This patent is subject to a terminal disclaimer.

(21) Appl. No.: 15/248,962

(22) Filed: Aug. 26, 2016

(65) Prior Publication Data
US 2018/0059283 A1 Mar. 1, 2018

(51) Int. Cl.
*G01V 13/00* (2006.01)
*G01V 5/10* (2006.01)

(52) U.S. Cl.
CPC ............. *G01V 5/101* (2013.01); *G01V 13/00* (2013.01)

(58) Field of Classification Search
None
See application file for complete search history.

(56) References Cited

U.S. PATENT DOCUMENTS

| | | | |
|---|---|---|---|
| 4,542,292 A | 9/1985 | Ellis | |
| 5,120,955 A | 6/1992 | Galford | |
| 7,081,616 B2 | 7/2006 | Grau et al. | |
| 9,823,384 B1* | 11/2017 | Wang | G01V 5/101 |
| 2015/0090870 A1* | 4/2015 | Stoller | G01V 5/101 |
| | | | 250/269.7 |

OTHER PUBLICATIONS

Flanagan, et al, "A New Generation Nuclear Logging System," SPWLA 32nd Annual Logging Symposian, Jun. 16-19, 1991, 25 pp.
Xu, et al., "Spectral Gamma Ray Measurement While Drilling", SPWLA 56th Annual Logging Symposium, Jul. 18-22, 2015, 17 pp.
Ellis, Darwin V., "Correction of NGT Logs for the Presence of KCl and Barite Muds," SPWLA 23rd Annual Logging Symposium, Jul. 6-9, 1982, 12 pp.

* cited by examiner

*Primary Examiner* — Edwin Gunberg

(57) ABSTRACT

A method for correcting natural gamma ray measurements includes processing an acquired gamma ray spectrum in combination with elemental standard spectra and at least one standard mud activation spectrum to compute corrected natural gamma ray measurements. The gamma ray spectrum is acquired using a logging string employing a neutron source and a natural gamma ray sensor.

20 Claims, 5 Drawing Sheets

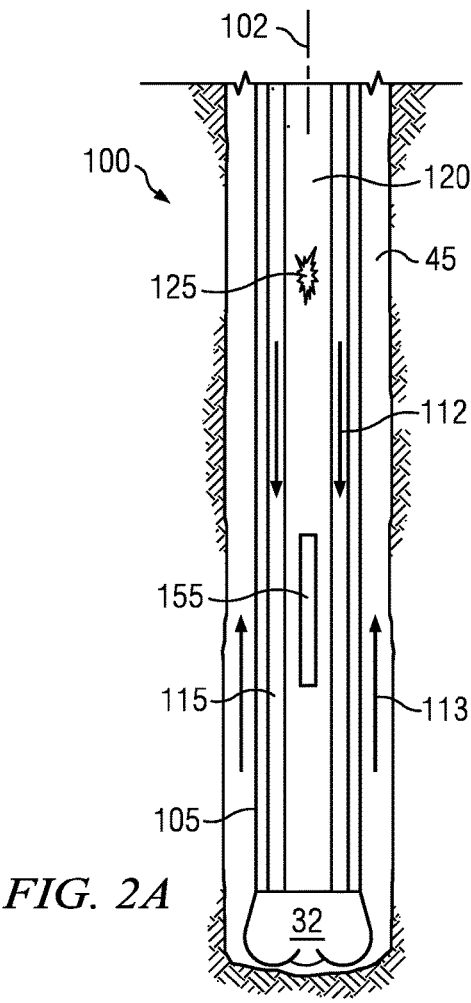 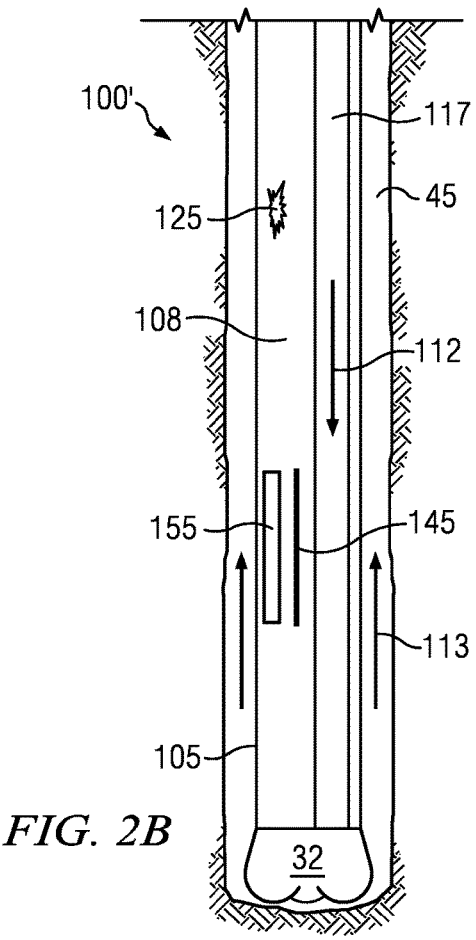
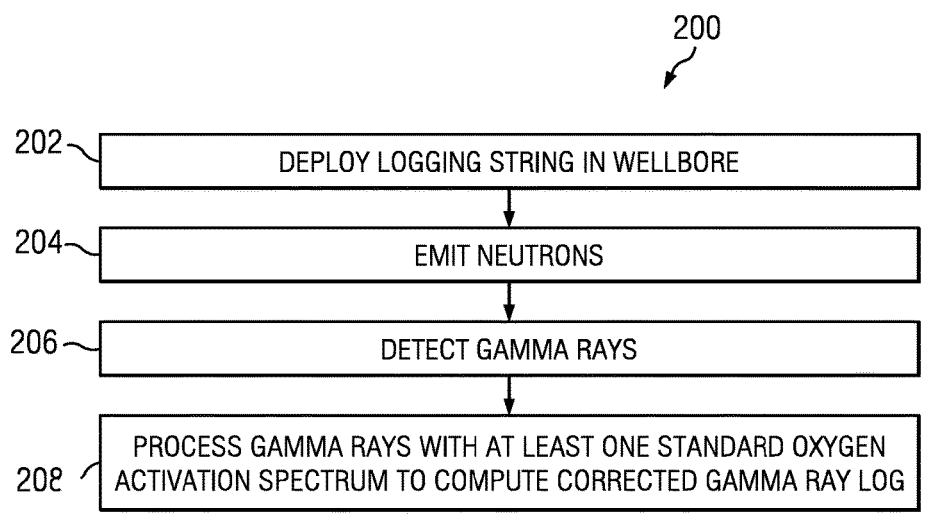
FIG. 3

METHOD FOR CORRECTING NATURAL GAMMA RAY LOGGING MEASUREMENTS

CROSS REFERENCE TO RELATED APPLICATIONS

None.

FIELD OF THE INVENTION

Disclosed embodiments relate generally to nuclear logging operations and more specifically to a method of correcting natural gamma ray logs for measurement bias caused by mud (e.g., oxygen) activation induced gamma rays.

BACKGROUND INFORMATION

Natural gamma ray logging is one of the most common logging techniques in the oil and gas industry. Such logging operations measure the naturally occurring gamma radiation emitted by a subterranean formation, primarily from potassium, uranium, and thorium containing minerals in the formation. Both total gamma ray and spectral gamma ray sensors are commonly employed. Total gamma ray sensors measure the total number of detected gamma rays with an energy above a predetermined threshold. Spectral gamma ray sensors measure the energy spectrum of the emitted gamma rays and may be used to determine the weight concentrations of potassium, uranium, and thorium in the formation.

In operations in which the tool string further includes a neutron source, such as a pulsed neutron generator or a chemical neutron source as found in common nuclear logging tools, drilling fluids (mud) in the borehole may be activated by the generated neutrons. Such activated mud is known to emit gamma rays that may be detected by a natural gamma ray sensor and thereby bias natural gamma ray logging measurements. There is a need in the art for a method of correcting natural gamma ray logging measurements for mud activation induced gamma ray bias.

SUMMARY

A method for correcting natural gamma ray measurements is disclosed. The method includes deploying a logging string in a subterranean wellbore in which the logging string includes a neutron source and a natural gamma ray sensor. Neutrons are emitted by the neutron source and a gamma ray spectrum is acquired by the gamma ray detector. The acquired gamma ray spectrum is processed in combination with elemental standard spectra and at least one standard mud activation spectrum to compute corrected natural gamma ray measurements.

The disclosed embodiments may provide various technical advantages. For example, disclosed embodiments may provide corrected natural gamma ray measurements that account for mud activation during a natural gamma ray logging operation and may therefore provide for an accurate determination of potassium, uranium, and thorium concentrations in the subterranean formation. In example embodiments the correction methodology may correct for activation of both downwardly and upwardly flowing drilling fluid. The down flow and up flow activation may be accounted for using distinct first and second standards and/or a single standard (e.g., a mixed standard).

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

For a more complete understanding of the disclosed subject matter, and advantages thereof, reference is now made to the following descriptions taken in conjunction with the accompanying drawings, in which:

FIGS. 2A and 2B depict mandrel (2A) and chassis (2B) based embodiments of the nuclear logging string shown on FIG. 1.

FIG. 3 depicts a flow chart of one disclosed method embodiment.

DETAILED DESCRIPTION

Figure 1:
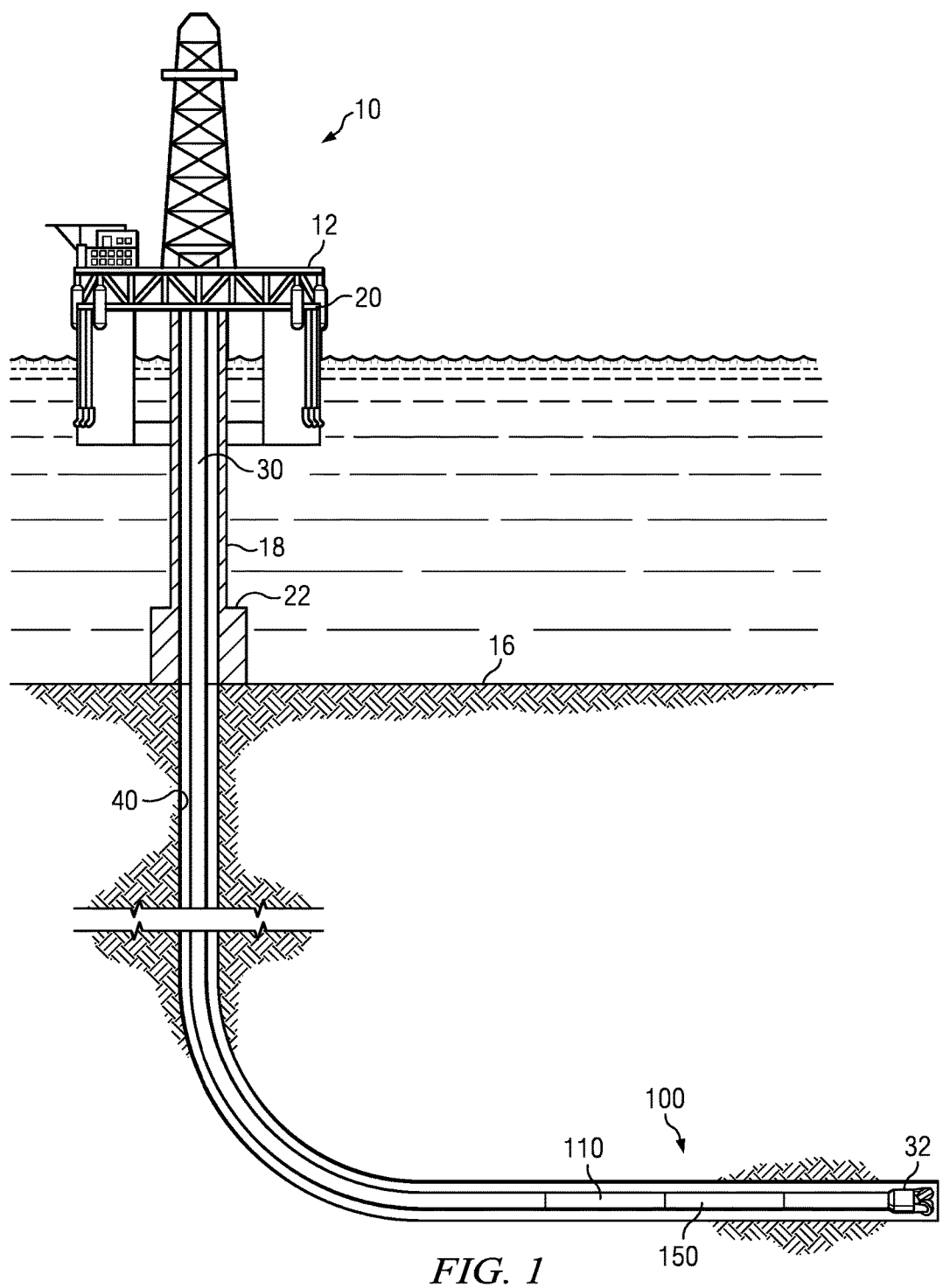
FIG. 1 depicts one example of a drilling rig on which disclosed logging string and logging method embodiments may be utilized.

FIG. 1 depicts one example embodiment of a nuclear logging string 100 in use in an offshore oil or gas drilling assembly, generally denoted 10. In FIG. 1, a semisubmersible drilling platform 12 is positioned over an oil or gas formation disposed below the sea floor 16. A subsea conduit 18 extends from deck 20 of platform 12 to a wellhead installation 22. The platform may include a derrick and a hoisting apparatus for raising and lowering the drill string 30, which, as shown, extends into borehole 40 and includes a drill bit 32 and the nuclear logging string 100. Embodiments of the nuclear logging string 100 include at least one neutron source and at least one gamma ray sensor. For example, in the depicted embodiment, logging string 100 includes a neutron logging tool 110 including a neutron source and a gamma ray logging tool 150 including a gamma ray sensor. Drill string 30 may further include, for example, a downhole drilling motor, a mud pulse telemetry system, a steering tool, and/or one or more of numerous other measurement while drilling (MWD) and logging while drilling (LWD) sensors for sensing downhole characteristics of the borehole and the surrounding formation. The disclosed embodiments are not limited in these regards.

It will be understood that the deployment depicted on FIG. 1 is merely an example for the purposes of describing the disclosed embodiments. It will be further understood that methods in accordance with the disclosed embodiments are not limited to use in offshore drilling operations, but are equally well suited for use with any kind of subterranean drilling operation, either offshore or onshore.

FIGS. 2A and 2B depict mandrel (2A) and chassis (2B) based embodiments of nuclear logging string 100. In FIG. 2A logging string 100 includes a central mandrel 120 on which the neutron source 125 and the gamma ray detector 155 are deployed. In the depicted embodiment, the mandrel 120 and the gamma ray detector 155 are substantially coaxial with a longitudinal axis 102 of the string 100. Drilling fluid is pumped downhole 112 through an annular flow channel 115 (radially between mandrel 120 and drill collar 105) to the bit 32 and flows upwards 113 through wellbore annulus 45.

In FIG. 2B logging string 100' includes a neutron source 125 and a gamma ray detector 155 deployed off axis in a drill collar 105 or tool chassis 108. Drilling fluid is pumped downhole 112 through an off axis channel 117 and flows upwards 113 through wellbore annulus 45. Optional shielding 145 may be provided between the gamma ray detector 155 and the channel 117.

With continued reference to FIGS. 2A and 2B, neutron source 125 may include substantially any suitable neutron source, for example, including a sealed chemical source or an electrical source. A suitable chemical source of neutrons may include an alpha-emitter mixed with beryllium such as the americium-241/beryllium chemical source. The neutron source 125 may also include the californium-252 chemical source. Suitable electrical neutron sources may be substantially continuous or pulsed and commonly make use of the deuterium-tritium (D-T) nuclear reaction, the deuterium-deuterium (D-D) nuclear reaction, and/or the tritium-tritium (T-T) nuclear reaction for example. The gamma ray detector may include substantially any suitable gamma ray detector, for example, including a sodium iodide (NaI) scintillator crystal and a photomultiplier.

FIG. 3 depicts a flow chart of one disclosed method embodiment 200. An LWD tool string including a neutron source and a gamma ray sensor is deployed in a subterranean wellbore at 202. Neutrons are emitted into the wellbore at 204 thereby activating the drilling fluid (inducing the drilling fluid to emit gamma rays as described in more detail below). Gamma rays are detected at 206. The detected gamma rays may include both natural gamma rays emitted by the formation and "activated" gamma rays emitted by the activated drilling fluid. The detected gamma rays are processed at 208 in combination with at least one standard mud activation spectrum (e.g., a standard oxygen activation spectrum, a standard silicon activation spectrum, and/or a standard barium activation spectrum) to correct the natural gamma ray logging measurements detected at 206 for mud activation induced gamma ray bias. The corrected gamma ray logging measurements may then be further processed, for example, to compute potassium, uranium, and thorium concentrations in the subterranean formation.

As is known to those of ordinary skill in the art, natural gamma ray measurements are intended to measure the naturally occurring gamma rays emitted by an earth formation and may be used, for example, to determine weight concentrations of potassium, uranium, and thorium in the formation. Natural gamma ray measurements may be affected by induced radioactivity, for example, due to silicon, barium, and/or oxygen activation in drilling fluids when the drilling fluids are activated by a nearby neutron source.

Oxygen activation is a nuclear phenomenon in which oxygen $^{16}O$ is activated by high energy neutrons to produce a nitrogen isotope $^{16}N$. The $^{16}N$ isotope decays back to $^{16}O$ with a half-life of about 7 seconds. A large fraction of the decays will result in the emission of a 6.13 MeV gamma ray. When oxygen atoms in the drilling fluid are activated, the corresponding gamma rays may be detected by the natural gamma ray detector in the logging string. For example, oxygen activation may increase the total number of gamma rays detected and the total number of gamma rays detected having an energy above a threshold such as 3 MeV. Likewise activation of silicon and/or barium in the drilling fluid may also result in additional gamma rays being detected.

Figure 4:
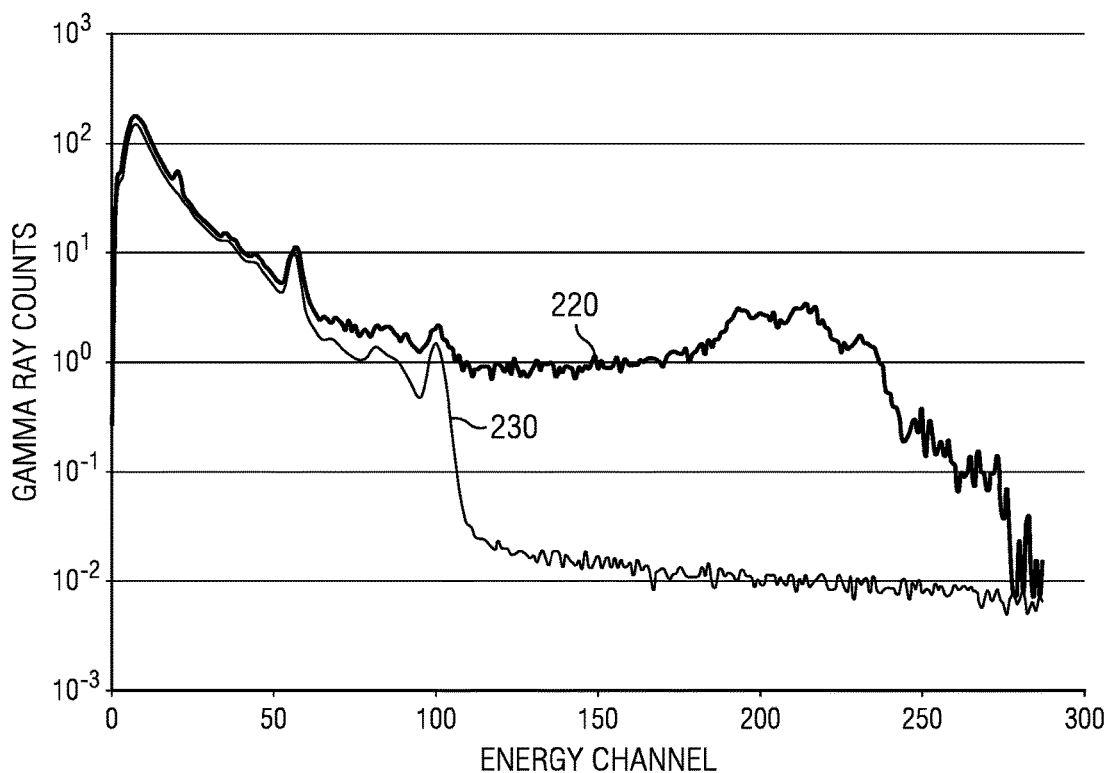
FIG. 4 depicts gamma ray spectra for a test granite formation with and without oxygen activation.

FIG. 4 depicts gamma ray spectra for a granite test formation with 220 and without 230 oxygen activation. The spectra are depicted as plots of gamma ray counts (or count rates) on the vertical axis versus energy channel on the horizontal axis (in which the detected gamma ray energy increases with increasing channel number). Note that oxygen activation increases the received gamma ray counts, particularly at energies greater than about 1.5 MeV and most particularly at energies greater than about 3 MeV. In the depicted example, oxygen activation results in about a two-fold increase in the number of gamma rays having energies between about 1.5 and about 3 MeV and about a 100 times increase in the number of gamma rays having energies greater than about 3 MeV. It will thus be understood that oxygen activation can, in certain operational circumstances, have a measurable impact on natural gamma ray logging measurements.

In spectral gamma ray measurements, oxygen activation (which as described above is one type of mud activation) may also change the shape of the gamma ray spectrum, particularly at intermediate and higher energies (e.g., as described above). Silicon and barium activation may also affect the shape of the measured gamma ray spectrum. In the disclosed embodiments it is desirable to obtain the contributions of potassium, uranium, and thorium in the formation (independent of the oxygen activation) to the measured gamma ray spectrum.

Figure 5:
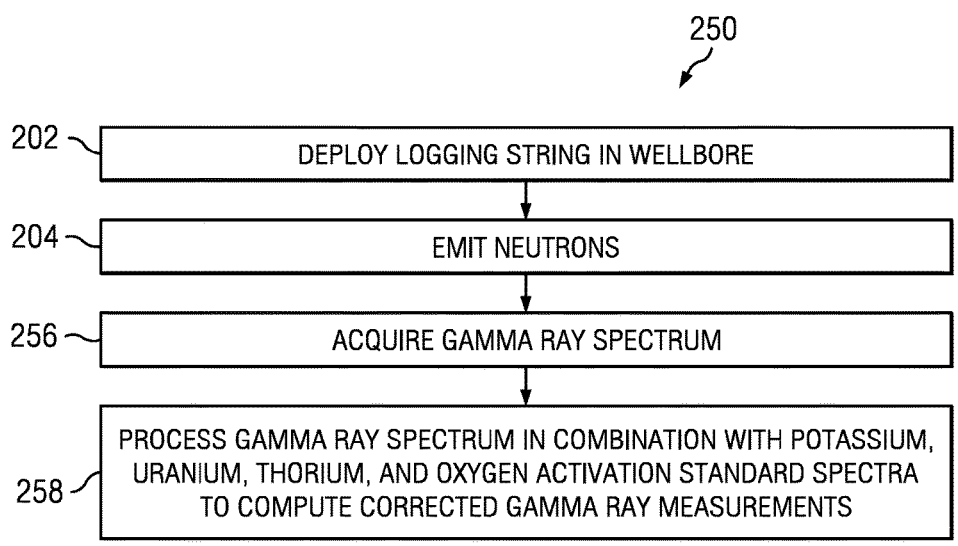
FIG. 5 depicts a flow chart of another disclosed method embodiment.

FIG. 5 depicts a flow chart of another disclosed method embodiment 250. As with method 200 (FIG. 3) a logging while drilling tool string including a neutron source and a gamma ray sensor is deployed in a subterranean wellbore at 202. Neutrons are emitted into the wellbore at 204 thereby activating the drilling fluid. A gamma ray spectrum is acquired at 256 and processed at 258 in combination with standard elemental potassium, uranium, and thorium standard spectra and an oxygen activation standard using a weighted linear least squares analysis to compute potassium, uranium, thorium, and oxygen activation yields (or counts). The potassium, uranium, and thorium yields may be taken as corrected gamma ray measurements. Additionally, the oxygen activation yield computed at 258 may be subtracted from the gamma ray measurements acquired at 256 to obtain corrected gamma ray measurements.

Figure 6:
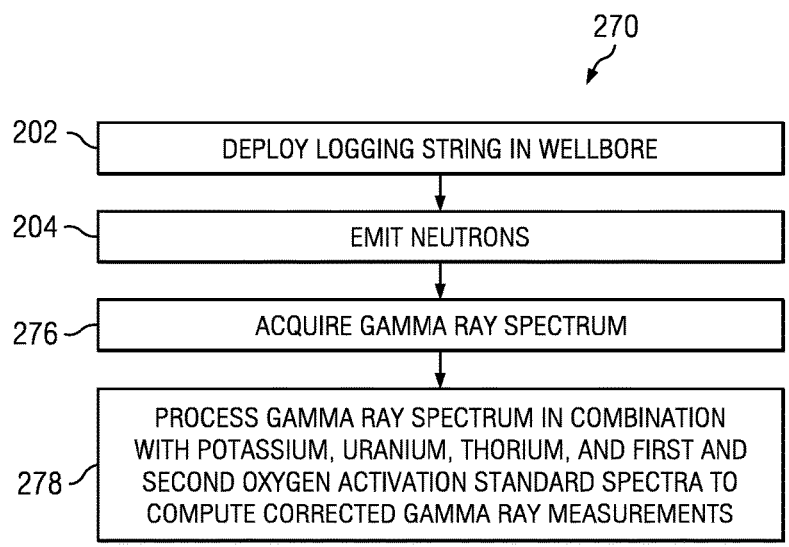
FIG. 6 depicts a flow chart of yet another disclosed method embodiment.

FIG. 6 depicts a flow chart of yet another disclosed method embodiment 270. As with methods 200 and 250 (FIGS. 3 and 5) a logging while drilling tool string including a neutron source and a gamma ray sensor is deployed in a subterranean wellbore at 202. Neutrons are emitted into the wellbore at 204 thereby activating the drilling fluid. A gamma ray spectrum is acquired at 276 and processed at 278 in combination with standard elemental potassium, uranium, and thorium standard spectra and first and second oxygen activation standards using a weighted linear least squares analysis to compute potassium, uranium, thorium, and first and second oxygen activation yields (or counts). The potassium, uranium, and thorium yields may be taken as corrected gamma ray measurements. Additionally, the first and second oxygen activation yields (e.g., down flow and up flow yields) computed at 278 may be subtracted from the gamma ray measurements acquired at 276 to obtain corrected gamma ray measurements.

It will be appreciated that spectral gamma ray measurements may be made over substantially any suitable number of energy windows. In one embodiment a measured gamma ray spectrum may include a small number of broad energy windows, for example from about three to about five windows. In another embodiment a measured gamma ray spectrum may include a large number of fine energy channels, for example including 128 or more channels. The disclosed embodiments are not limited in this regard.

Figure 7A:
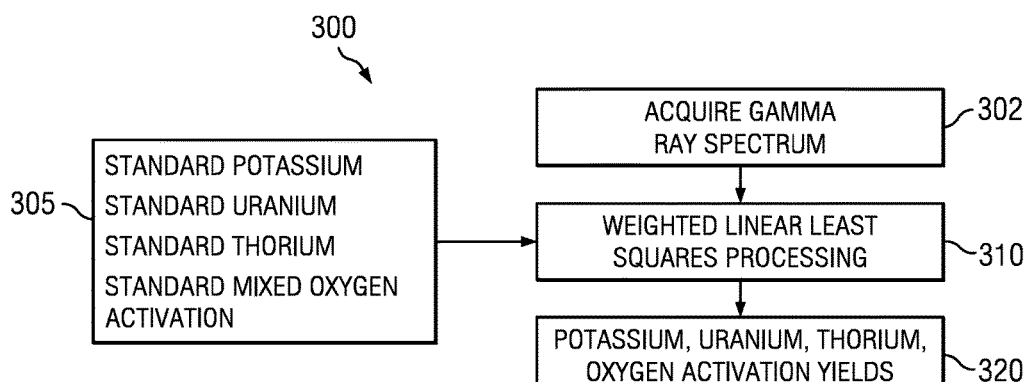
FIGS. 7A and 7B depict example fast and slow loop processing algorithms that may be used in combination to correct measured gamma ray spectra for oxygen activation.
Figure 7B:
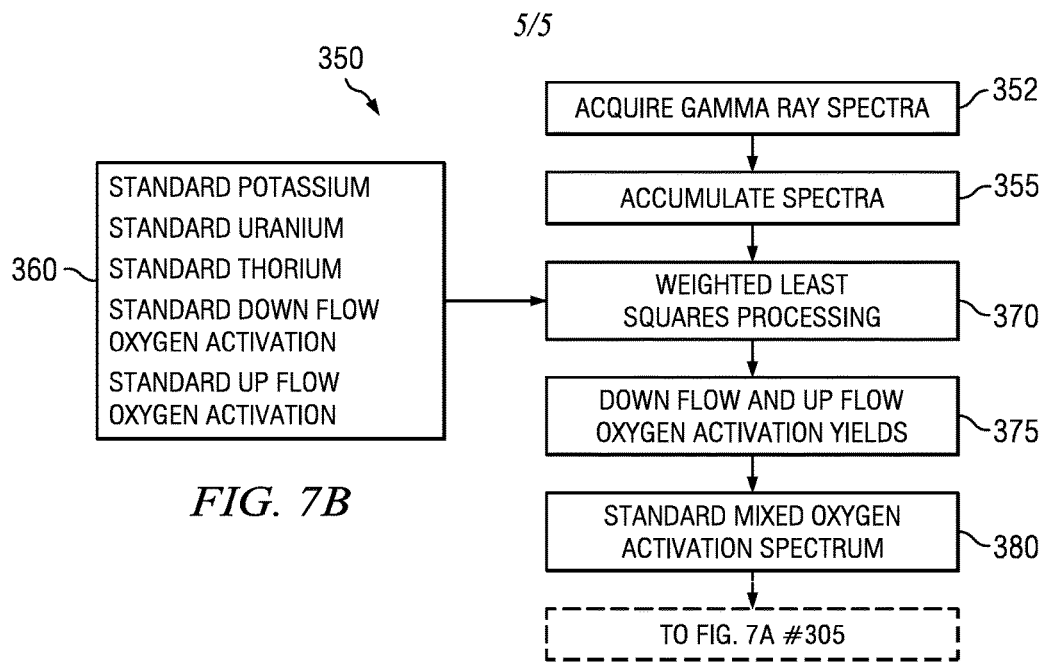

FIGS. 7A and 7B depict example fast and slow loop processing algorithms 300 and 350 that may be used in combination to process the measured gamma ray spectra and thereby correct the spectra for oxygen activation yields. In FIG. 7A an acquired gamma ray spectrum 302 is processed in combination with elemental potassium, uranium, and thorium standard spectra and a standard mixed oxygen activation spectrum 305 using a weighted linear least squares analysis at 310 to obtain potassium, uranium, thorium, and oxygen activation yields (or counts) at 320. The potassium, uranium, and thorium yields represent the corrected measurements in this particular embodiment.

In FIG. 7B acquired gamma ray spectra 352 are accumulated at 355 (i.e., stacked or summed) to obtain an average spectrum over a predetermined time interval. For example, gamma ray spectra (each of which may be acquired at 352 in about 10 seconds) may be accumulated for about 10 to 20 minutes at 355 to obtain the average spectrum. The accumulated gamma ray spectrum is processed in combination with standard potassium, uranium, and thorium elemental standard spectra as well as first and second standard oxygen activation spectra (depicted at 360) using a weighted least squares analysis at 370 to compute first and second oxygen activation yields at 375. The first and second oxygen activation yields may be further processed (e.g., via computing a ratio) to further compute a standard mixed oxygen activation spectrum at 380. The standard mixed oxygen activation spectrum may then be optionally input to block 305 of the fast loop 300.

In one embodiment, the first and second standard oxygen activation spectra may include down flow and up flow standard oxygen activation spectra and thus may be processed to compute down flow and up flow oxygen activation yields. In another embodiment, the first standard oxygen activation spectrum may include, for example, a mixed spectrum (e.g., made up of an average or weighted average of the down flow and up flow standard spectra) and the second standard oxygen spectrum may include a difference between the down flow and up flow standard spectra.

The standard mixed oxygen activation spectrum may be computed, for example, based on a computed ratio of the first and second oxygen activation yields. For example, the standard mixed oxygen activation spectrum may be generated by mixing the first and second standard oxygen activation spectra at the computed ratio (i.e., such that the number of counts in each channel of the standard mixed spectrum is a weighted average of the number of counts in the first and second standard spectra). In such an embodiment, the number of counts in each channel of the standard mixed spectrum may computed according to the following equation:

$$M_i = F_i \frac{n}{n+1} + S_i \frac{1}{n+1}$$

where $M_i$ represents the number of counts in each channel i of the standard mixed spectrum, $F_i$ represents the number of counts in each channel i of the first standard oxygen activation spectrum, $S_i$ represents the number of counts in each channel i of the second standard oxygen activation spectrum, and n represents the ratio of the first to the second oxygen activation yields.

The use of one oxygen activation standard (the mixed standard) in the fast loop may (in certain embodiments) provide for improved measurement precision as compared to using two standards. The mixed standard may be adjusted using the slow loop to match drilling conditions. For example, when drilling conditions change, the slow loop analysis may detect the change in a changing ratio of down flow to up flow yields and then may in turn update the mixed standard oxygen activation spectrum based on the changing ratio. In this way the mixed standard oxygen activation spectrum may be tuned to more accurately match the drilling conditions and thereby produce more accurate potassium, uranium, and thorium yields (i.e., corrected measurements having improved accuracy).

It will be appreciated that substantially any suitable standard spectra may be utilized. For example, standard potassium, uranium, and thorium spectra are well known in the art. Standard borehole potassium spectra are also known in the art. These standard spectra may also be determined empirically (e.g., by making natural gamma ray measurements in an artificial borehole formed in standard formations including known concentrations of potassium, uranium, and thorium). Should other radioactive elements be present, as may be the case when using radioactive tracers or when drilling in formations containing radioactive contaminants, additional standard spectra may be used.

Standard oxygen activation spectra may also be determined empirically. These spectra are generally dependent on the gamma ray tool or gamma ray sensor configuration, (e.g., chassis or mandrel, as well as the detailed construction of the tool section in the vicinity of the gamma ray detector), and the borehole diameter. The standard spectra may also be dependent on the type of drilling fluid used (i.e., its composition and density). It may therefore be advantageous to obtain standard spectra for several possible configurations.

In one embodiment, a logging string including a spectral gamma ray detector may be deployed in a borehole in a laboratory test formation. Drilling fluid may be pumped past a neutron source and down through the logging string. A measured gamma ray spectrum may be taken to be a down flow standard spectrum. The drilling fluid may also be pumped past the neutron source and up through the borehole annulus to measure an up flow standard spectrum. Moreover, drilling fluid may be pumped past the neutron source, down through the logging string, and then up through the borehole annulus to obtain a combined standard spectrum.

Figure 8:
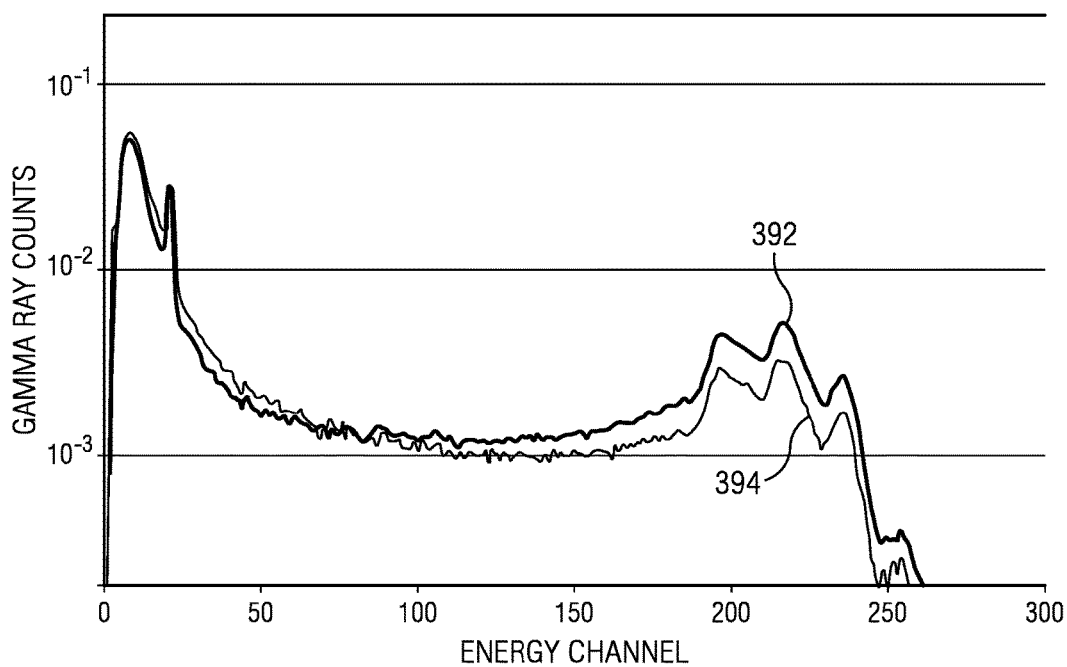
FIG. 8 depicts example standard down flow and up flow oxygen activation gamma ray spectra for a mandrel based logging string (e.g., as depicted on FIG. 2A).

FIG. 8 depicts example standard down flow 392 and up flow 394 oxygen activation gamma ray spectra for a mandrel based logging string (e.g., as depicted on FIG. 2A). The spectra are depicted as plots of normalized gamma ray counts on the vertical axis versus energy channel on the horizontal axis (in which the gamma ray energy increases with increasing channel number). The down flow standard spectrum has higher normalized counts at higher energies while the up flow standard spectrum has higher normalized counts at lower energies. The spectra depicted on FIG. 8 may be used, for example, at element 208 of FIG. 3 or element 275 of FIG. 6 to compute corrected natural gamma ray measurements.

The intensity of the induced oxygen activation generally depends on the duration of mud irradiation (the activation time) and the length of time it takes for the mud to travel from the neutron source to the gamma ray detector (the decay time). Owing to the short half-life of the oxygen activation (about seven seconds), the measured intensity of the induced oxygen activation tends to be sensitive to several downhole factors that can affect the activation time and/or the decay time. These factors include the volumetric flow rate (or total fluid velocity) and the borehole diameter. BHA geometric factors such as the distance between the neutron source and the gamma ray detector, the distance between the gamma ray detector and the drill bit, the mud channel diameter, and other factors can also affect the activation time and/or the decay time. However, once a BHA configuration is selected, these parameters are generally fixed and known.

With reference again to FIGS. 2A and 2B, it will be appreciated that a mandrel based gamma ray detector (as depicted on FIG. 2A) is generally more sensitive to down flow activation and less sensitive to up flow activation (as the gamma ray sensor is in closer proximity to the downwardly flowing drilling fluid). A chassis based gamma ray sensor (as depicted on FIG. 2B) is generally more sensitive to up flow activation and less sensitive to down flow activation (as the gamma ray sensor is in closer proximity to the upwardly flowing drilling fluid and may optionally be shielded from the downwardly flowing fluid). Notwithstanding the above, the disclosed embodiments are intended to be suitable for use with substantially any logging string and gamma ray detector configuration.

While not depicted in the FIGS., it will be understood that a portion of the disclosed method embodiments may be implemented either uphole (e.g., by an operator at the surface or on a surface computer) or downhole (e.g., by a downhole controller deployed in the logging string). The disclosed embodiments are in no way limited in these regards. Moreover, it will be further understood that the aspects and features of the disclosed embodiments may be embodied as logic that may be processed by, for example, a computer, a microprocessor, hardware, firmware, programmable circuitry, or any other processing device known in the art. Similarly the logic may be embodied on software suitable to be executed by a processor, as is also well known in the art. The disclosed embodiments are not limited in any of these regards.

A suitable downhole controller may include, for example, a programmable processor, such as a microprocessor or a microcontroller and processor-readable or computer-readable program code embodying logic. A suitable processor may be utilized, for example, to execute a portion of the method embodiments described above with respect to FIGS. 3, 5, 6, 7A, and 7B. For example, a downhole controller may be configured to process measured gamma ray spectra to compute potassium, uranium, and thorium yields (counts) which may be further processed to compute concentrations of potassium, uranium, and thorium in the subterranean formation. The yields and/or concentrations may be optionally transmitted to the surface while drilling (e.g., via known telemetry techniques).

A suitable controller may be further configured to control operation of the gamma ray detector(s) and the neutron generator(s). A suitable controller may also optionally include other controllable components, such as data storage devices, power supplies, timers, and the like and may optionally communicate with other instruments in the drill string, for example, including telemetry systems that communicate with the surface. A suitable controller may further optionally include volatile or non-volatile memory or a data storage device for storing measured gamma ray spectra for further post-processing.

Although a method for correcting natural gamma ray logging measurements and certain advantages thereof have been described in detail, it should be understood that various changes, substitutions and alternations can be made herein without departing from the spirit and scope of the disclosure as defined by the appended claims.

What is claimed is:

1. A method for correcting natural gamma ray measurements, the method comprising:
   (a) deploying a logging string in a subterranean wellbore, the logging string including a neutron source and a gamma ray sensor;
   (b) causing the neutron source to emit neutrons;
   (c) causing the gamma ray sensor to acquire a gamma ray spectrum; and
   (d) processing the acquired gamma ray spectrum in combination with elemental standard spectra and at least one standard mud activation spectrum to compute corrected natural gamma ray measurements.

2. The method of claim 1, wherein the standard mud activation spectrum comprises at least one of a standard oxygen activation spectrum, a standard silicon activation spectrum, and a standard barium activation spectrum.

3. The method of claim 1, wherein the elemental standard spectra comprise potassium, uranium, and thorium standard spectra.

4. The method of claim 1, wherein the acquired gamma ray spectrum is processed in (d) using a weighted least squares analysis.

5. The method of claim 1, wherein (d) comprises processing the acquired gamma ray spectrum in combination with elemental standard spectra and first and second standard oxygen activation spectra to compute corrected natural gamma ray measurements.

6. The method of claim 5, wherein the first standard oxygen activation spectrum comprises a down flow standard oxygen activation spectrum and the second standard oxygen activation spectrum comprises an up flow standard oxygen activation spectrum.

7. The method of claim 5, wherein the first standard oxygen activation spectrum comprises an average or weighted average of a down flow standard oxygen activation spectrum and an up flow standard oxygen activation spectrum and the second standard oxygen activation spectrum comprises a difference between the down flow standard oxygen activation spectrum and the up flow standard oxygen activation spectrum.

8. The method of claim 1, wherein (c) further comprises summing a plurality of spectra to obtain an average spectrum.

9. The method of claim 8, wherein (d) further comprises:
   (i) processing the average spectrum in combination with standard elemental spectra and first and second standard oxygen activation spectra to compute first and second oxygen activation yields;
   (ii) processing the first and second oxygen activation yields to compute a mixed standard oxygen activation spectrum; and
   (iii) processing the gamma ray spectrum acquired in (c) in combination with standard elemental spectra and the standard mixed oxygen activation spectrum to compute the corrected natural gamma ray measurements.

10. The method of claim 1, wherein (d) further comprises:
    (i) processing the acquired gamma ray spectrum in combination with standard elemental spectra and first and second standard oxygen activation spectra to compute first and second oxygen activation yields;

(ii) processing the first and second oxygen activation yields to compute a mixed standard oxygen activation spectrum; and (iii) processing the gamma ray spectrum in combination with the standard elemental spectra and the standard mixed oxygen activation spectrum to compute the corrected natural gamma ray measurements.

11. The method of claim 10, wherein (ii) comprises:

(iia) processing the first and second oxygen activation yields to compute a ratio thereof; and (iib) processing the ratio to compute the mixed standard oxygen activation spectrum.

12. The method of claim 11, wherein the mixed standard oxygen activation spectrum is computed using the following mathematical equation:

$$M_i = F_i \frac{n}{n+1} + S_i \frac{1}{n+1}$$

wherein $M_i$ represents a number of counts in each channel i of the standard mixed oxygen activation spectrum, $F_i$ represents the number of counts in each channel i of the first standard oxygen activation spectrum, $S_i$ represents the number of counts in each channel i of the second standard oxygen activation spectrum, and n represents the ratio computed in (iia).

13. The method of claim 1, wherein the corrected natural gamma ray measurements comprise corrected potassium counts, uranium counts, and thorium counts.

14. The method of claim 1, further comprising:

(e) processing the corrected natural gamma ray measurements to compute concentrations of potassium, uranium, and thorium in a subterranean formation.

15. A method for correcting natural gamma ray measurements, the method comprising:

(a) deploying a logging while drilling string in a subterranean wellbore, the logging while drilling string including an electrical neutron source and a gamma ray sensor;

(b) causing the electrical neutron source to emit neutrons;

(c) causing the gamma ray sensor to acquire a gamma ray spectrum;

(d) processing the acquired gamma ray spectrum in combination with standard elemental spectra and first and second standard oxygen activation spectra to compute first and second oxygen activation yields;

(e) processing the first and second oxygen activation yields to compute a mixed standard oxygen activation spectrum; and (f) processing the gamma ray spectrum in combination with the standard elemental spectra and the standard mixed oxygen activation spectrum to compute the corrected natural gamma ray measurements.

16. The method of claim 15, wherein (e) comprises:

(i) processing the first and second oxygen activation yields to compute a ratio thereof; and (ii) processing the ratio to compute the mixed standard oxygen activation spectrum.

17. The method of claim 16, wherein the mixed standard oxygen activation spectrum is computed using the following mathematical equation:

$$M_i = F_i \frac{n}{n+1} + S_i \frac{1}{n+1}$$

wherein $M_i$ represents a number of counts in each channel i of the standard mixed oxygen activation spectrum, $F_i$ represents the number of counts in each channel i of the first standard oxygen activation spectrum, $S_i$ represents the number of counts in each channel i of the second standard oxygen activation spectrum, and n represents the ratio computed in (i).

18. The method of claim 15, wherein the corrected natural gamma ray measurements comprise corrected potassium counts, uranium counts, and thorium counts.

19. The method of claim 15, further comprising:

(e) processing the corrected natural gamma ray measurements to compute concentrations of potassium, uranium, and thorium in a subterranean formation.

20. The method of claim 15, wherein the processing in (d), (e), and (f) is implemented via a downhole controller deployed in the logging string.

* * * * *